(12) United States Patent
Vijayakumaran

(10) Patent No.: US 9,184,994 B2
(45) Date of Patent: Nov. 10, 2015

(54) DOWNTIME CALCULATOR

(75) Inventor: Vinod Vijayakumaran, Bangalore (IN)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 13/563,956

(22) Filed: Aug. 1, 2012

(65) Prior Publication Data

US 2014/0040453 A1    Feb. 6, 2014

(51) Int. Cl.
    *G06F 15/173*      (2006.01)
    *H04L 12/24*      (2006.01)
    *G06F 11/34*      (2006.01)

(52) U.S. Cl.
    CPC .......... *H04L 41/082* (2013.01); *G06F 11/3438* (2013.01)

(58) Field of Classification Search
    CPC ..................... H04L 41/082; G06F 11/3438
    USPC .................................................. 709/223, 224
    See application file for complete search history.

(56) References Cited

U.S. PATENT DOCUMENTS

| | | | | |
|---|---|---|---|---|
| 5,216,612 | A | * | 6/1993 | Cornett et al. ................. 700/96 |
| 2003/0070157 | A1 | * | 4/2003 | Adams et al. ................. 717/101 |
| 2004/0027400 | A1 | * | 2/2004 | Ryu et al. ......................... 347/5 |
| 2004/0057558 | A1 | * | 3/2004 | Beyda .......................... 379/9.01 |
| 2007/0083398 | A1 | * | 4/2007 | Ivey et al. .......................... 705/4 |
| 2008/0126040 | A1 | * | 5/2008 | Franklin et al. ................... 703/7 |
| 2009/0006884 | A1 | * | 1/2009 | Cahill et al. ...................... 714/4 |
| 2010/0091971 | A1 | * | 4/2010 | Famous .................... 379/210.01 |
| 2012/0110142 | A1 | * | 5/2012 | Montagna et al. ............ 709/220 |
| 2012/0254395 | A1 | * | 10/2012 | Bonas ........................... 709/224 |
| 2013/0067070 | A1 | * | 3/2013 | Rowe ............................ 709/224 |

OTHER PUBLICATIONS http://www.datto.com/resources/recovery-time-rto-downtime-cost-calculator.*
Kevin C. Mattos., System and Method for a Simple Network Management Protocol Downtime Calculator., Naval Undersea Warfare Center Div Newport RI., Sep. 2011., http://oai.dtic.mil/oai/oai?verb=getRecord&metadataPrefix=html&identifier=ADA558196.*

* cited by examiner

*Primary Examiner* — Kostas Katsikis
(74) *Attorney, Agent, or Firm* — Schwegman Lundberg & Woessner, P.A.

(57) ABSTRACT

A downtime calculator for a computer network system has a downtime request module, a user activity computation engine, and a downtime computation engine. The downtime request module receives attributes of a downtime request for the computer network system. The user activity computation engine determines activities of the computer network system based on geographic regions and local times of users accessing the computer network system. The downtime computation engine calculates a recommended downtime of the computer network system based on the attributes of the downtime request and user activities on the computer network system.

20 Claims, 6 Drawing Sheets

DOWNTIME CALCULATOR

FIELD

The present disclosure relates generally to an information technology system tool, and in a specific example embodiment, to a downtime calculator.

BACKGROUND

A computer network system may serve clients in different geographic time zones. Performing downtime of a system during peak hours may result in customer dissatisfaction. The process of scheduling a downtime may be affected by unforeseen and unexpected different factors. Because of unexpected circumstances. IT department waste a lot of time rescheduling the downtime of the computer network system, resulting in delays.

BRIEF DESCRIPTION OF DRAWINGS

The appended drawings merely illustrate example embodiments of the present embodiment and cannot be considered as limiting its scope.

DETAILED DESCRIPTION

Figure 1:
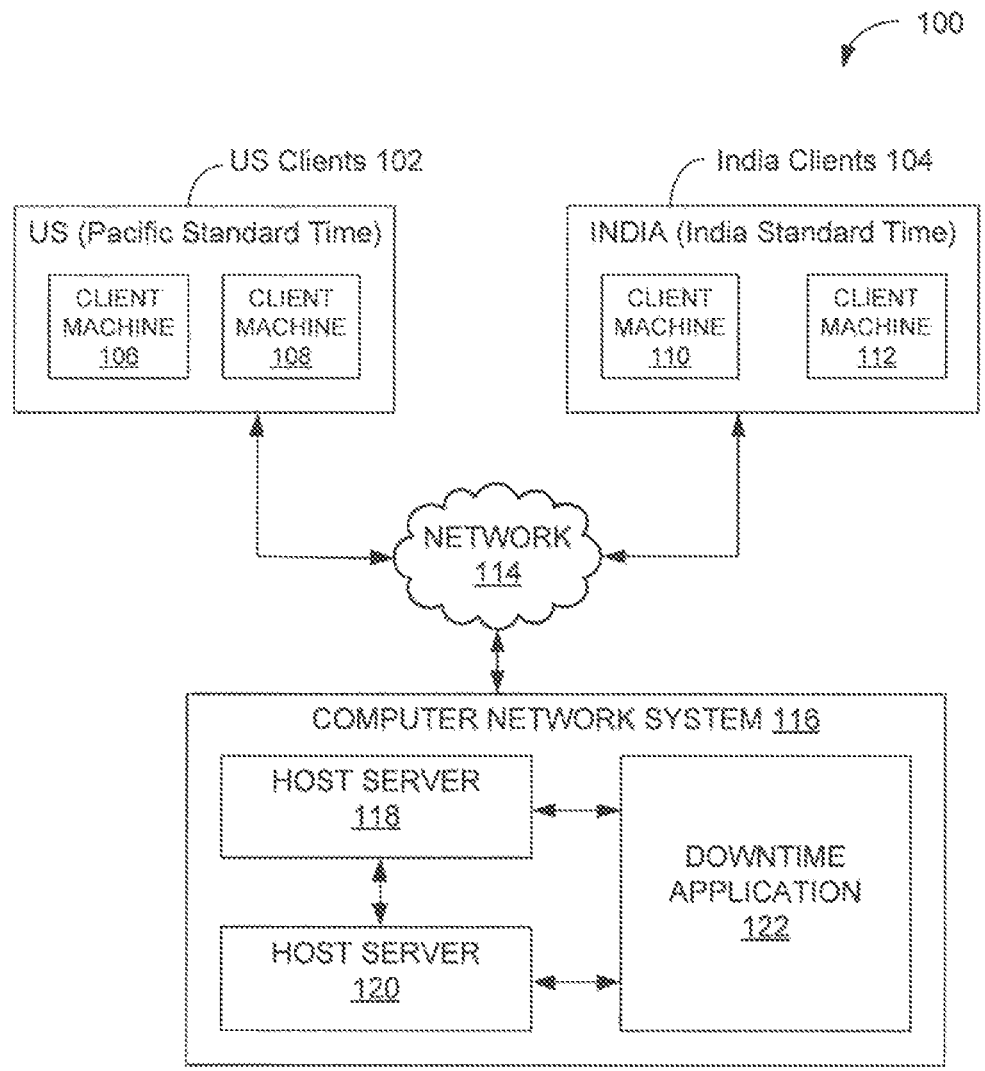
FIG. 1 is a block diagram illustrating an example of a system in which embodiments may be practiced.

The description that follows includes systems, methods, techniques, instruction sequences, and computing machine program products that embody illustrative embodiments of the present embodiment. In the following description, for purposes of explanation, numerous specific details are set forth in order to provide an understanding of various embodiments. It will be evident, however, to those skilled in the art, that embodiments of the inventive subject matter may be practiced without these specific details. In general, well-known instruction instances, protocols, structures, and techniques have not been shown in detail.

Example systems and methods for calculating a preferred time for a downtime of a computer network system are described. In one example embodiment, a downtime calculator for the computer network system has a downtime request module, a user activity computation engine, and a downtime computation engine. The downtime request module receives attributes of a downtime request for the computer network system. The user activity computation engine determines activities of the computer network system based on geographic regions and local times of users accessing the computer network system. The downtime computation engine calculates a recommended downtime of the computer network system based on the attributes of the downtime request and user activities on the computer network system. The computer network system has several servers geographically located in different geographic time zones.

In one example embodiment, the downtime computation engine calculates a recommended time and geographic time zone of a server of the computer network system based on an activity and criticality of the activity from the downtime request and based on users' login data to the servers of the computer network system within a predefined period of time.

In one example embodiment, the downtime request module includes a planning mode module, a maintenance week module, a downtime necessity module, a downtime activity module, a downtime duration module, and a risk module. The planning mode module identifies a category of downtime. The maintenance week module determines whether the downtime can be planned for a next maintenance week of the computer network system. The downtime necessity module determines a level of necessity of the downtime request. The downtime activity module identifies a name of an activity associated with the downtime request. The downtime duration module determines a duration of the downtime in the downtime request. The risk module determines a risk of bringing the computer network system back to an operating or normal condition after the downtime.

The categories of downtime can include, for example, a regular planned downtime, an irregular planned downtime, and an adhoc issue downtime.

In an example embodiment, the user activity computation engine includes a support location module and a user load module. The support location module determines geographic regions of support available for the computer network system. The user load module determines windows of time with the most number of users logged on to the computer network system.

In an example embodiment, the downtime computation engine has a preferred downtime module that calculates the recommended downtime of the computer network system to minimize the number of users of the computer network system affected by a downtime like that requested in the downtime request.

In another example embodiment, the recommended downtime of the computer network system is calculated based on a category of the downtime, whether the downtime can be planned for a next maintenance week of the computer network system, a level of necessity of the downtime request, a name of an activity associated with the downtime request, a duration of the downtime of the downtime request, a risk of bringing the computer network system back after the downtime, geographic regions of support available for the computer network system at the time of the downtime, and windows of time with the most number of users logged on to the computer network system.

FIG. 1 is a block diagram depicting an example environment 100 within which example embodiments may be deployed. The environment 100 includes clients located in different geographic time zones. For example, clients 102 are located in the US in a Pacific Standard Time zone. Clients 104 are located in India in an Indian Standard Time zone. US Clients 102 includes several client machines, for example, client machine 106 and 108. India Clients 104 includes several client machines, for example, client machine 110 and 112.

The client machines 106, 108, 110, and 112 may be a personal computer or a mobile computing device in communication with a computer network system 116.

In one embodiment, the client machines 106, 108, 110, and 112 may be used to access elements or processes of a business task hosted or supported by the computer network system 116. For example, applications within the computer network system 116 may provide users of clients 102 and 104 information on business tasks. The client machines 106, 108, 110, and 112 may execute a web browser (not shown) or a software application (not shown). For example, the web browser may be any browser commonly used to access a network of computers such as the World Wide Web. The web browser or the software application may load a user interface. In another embodiment, the web browser or the software application may display a visual representation of the business process in the user interface.

The environment 100 includes the computer network system 116. The computer network system 116 includes, for example, at least one host server host server 118 and host server 120 for providing information to clients 102 and 104. The host servers 118 and 120 execute one or more applications (e.g., email application, business object application). Both host servers 118 and 120 may be coupled with the computer network.

A business object application defines the process of a business task. For example, various participants need to perform several steps in the process of hiring an employee. A manager may request a job requisition for approval from a superior. In one embodiment, the business object application may process a business task with business objects. For example, a business object may correspond to one or more entities within the business object application that represent things in a business to which the business object application pertains. For example, the business object may map a source data structure in a database to business terms used by non-information technology analysts. The business object may also correspond to a function of the database or the business object application. For example, if the business object application is a human resources application pertaining to recruiting of candidates for job openings within a company, the business object may correspond to a person (e.g., a job candidate) who has applied for a job opening. The business object may include one or more data items. The data items of the business object may correspond to any data that one or more additional applications maintain with respect to the business object. For example, the data item may be a resume of a person (e.g., a candidate for an open position at a company) represented by the business object or the data item may be a time card of a person (e.g., an employee of a company) represented by the business object.

In one embodiment, the email application may be configured to enable the participants of the business task to communicate with each other and others. The email application may include a convention email server application.

In one embodiment, the host server 118 may physically reside in a different geographic time zone from host server 120. For example, host server 118 may reside in Europe while host server 120 resides in Asia. In another embodiment, both host servers 119 and 120 resides in the same geographic time zone.

The computer network system 116 includes a downtime application 122 for calculating a preferred downtime based on user load distribution on the computer network system 116 and the type of downtime activity. For example, an IT administrator may utilize the tool to determine an optimal downtime of the computer network system 116. The downtime application 122 is described in more detail with respect to FIG. 2.

The client machines 106, 108, 110, and 112, and the computer network system 116 may be coupled to each other via a network 114. The network 114 enables communication between systems. Accordingly, the network 114 may be a mobile telephone network, a plain old telephone (POTS) network, a wired network, a wireless network (e.g., a WiFi or WiMax network), or any suitable combination thereof. The communication may be based on any communication protocols. Examples of communication protocols include Transmission Control Protocol/Internet Protocol (TCP/IP), HyperText Transfer Protocol (HTTP), File Transfer Protocol (FTP), Simple Mail Transfer Protocol (SMTP), Post Office Protocol (POP), Internet Message Access Protocol (IMAP), Wireless Access Protocol (WAP), Gopher, wireless internet protocols, and instant messaging protocols. The network 114 may be implemented using the Internet, a wide area network (WAN), a local area network (LAN), or any suitable combination thereof.

Figure 2:
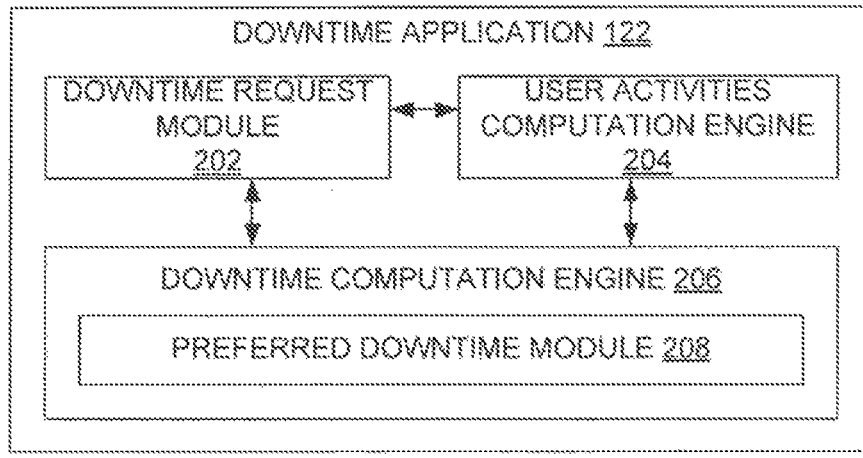
FIG. 2 is a block diagram illustrating a downtime calculator application, in accordance with an example embodiment.

FIG. 2 is a block diagram illustrating the downtime application 122, in accordance with an example embodiment. The downtime application 122 may include a downtime request module 202, a user activity computation engine 204, and a downtime computation engine 206.

The downtime request module 202 receives attributes of a downtime request from an IT administrator for the computer network system 116. As previously described, the computer network system 116 may have one or more servers geographically located in different geographic time zones. The user activity computation engine 204 determines activities of the computer network system 116 based on geographic regions and local times of users from clients 102 and 104 accessing the computer network system 116. The downtime computation engine 206 calculates a recommended downtime of the computer network system 116 based on the attributes of the downtime request and user activities on the computer network system 116.

In one embodiment, the downtime computation engine 206 includes a preferred downtime module 208 that calculates the recommended downtime of the computer network system 116 to minimize the number of users from client 102 and 104 of the computer network system 116 affected by a downtime of the downtime request.

Figure 3:
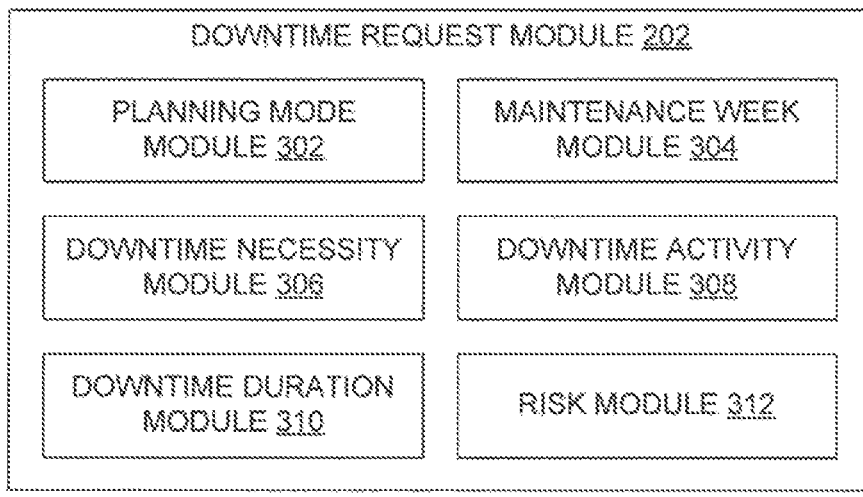
FIG. 3 is a block diagram illustrating an example embodiment of a downtime request module.

FIG. 3 is a block diagram illustrating an example embodiment of the downtime request module 202. The downtime request module 202 includes, for example, a planning mode module 302, a maintenance week module 304, a downtime necessity module 306, a downtime activity module 308, a downtime duration module 310, and a risk module 312.

The planning mode module 302 identifies a category of causes for downtime. They include, for example, a regular and planned downtime, an irregular and planned downtime, and an unplanned downtime. The regular and planned downtime includes planned activities that have their next occurrence timeframe known. They include, for example, kernel and weekly updates. The irregular and planned downtime includes planned activities that have their next occurrence timeframe unknown. They include, for example, kernel, database/operating system/file system upgrades, patch upgrades, and extra requests (parameter changes, language installations, and other small upgrades/activities). The unplanned downtime includes unplanned activities such as incidents that are ad hoc and need to be fixed when they occur. They include, for example, transports, kernel, file systems, long running jobs, and database restoration. The downtime request may include a category of causes attribute.

The maintenance week module 304 determines whether the downtime can be planned for a next maintenance week of the computer network system 116. An attribute of the downtime request identifies whether the downtime can be planned for the next maintenance week.

The downtime necessity module 306 determines a level of necessity of the downtime request. For example, the level of necessity of the downtime may be low, medium, and high. The downtime request may include a level of necessity attribute.

The downtime activity module 308 identifies a name of an activity associated with the downtime request. For example, the activity may be a kernel upgrade, a file system issue, a patch upgrade, language installations, parameter changes, and so forth.

The downtime duration module 310 determines duration of the downtime of the downtime request. For example, the downtime request may include a downtime duration attribute of 4 hours.

The risk module 312 determines a risk of bringing the computer network system 116 back to a normal operating condition after the downtime. For example, the downtime request may include a risk attribute of low, medium, or high.

Figure 4:
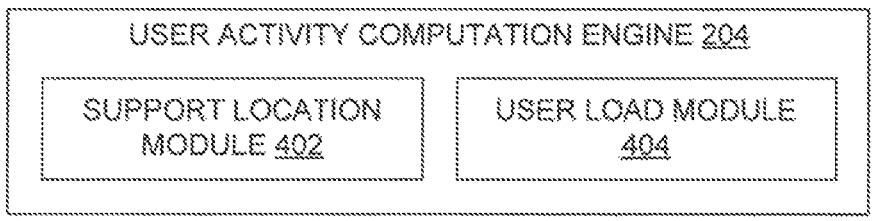
FIG. 4 is a block diagram illustrating an example embodiment of a user activity computation engine.

FIG. 4 is a block diagram illustrating an example embodiment of the user activity computation engine 204. The user activity computation engine 204 includes a support location module 402 and a user load module 404.

The support location module 402 determines geographic regions of support available for the computer network system 116. For example, the different geographic regions may include India, US west coast, US east coast, and Europe.

The user load module 404 determines windows of time with the largest number of users logged on to the computer network system 116 using, for example, statistics from the past week of users accessing the computer network system 116. The different windows of time include, for example, 5 AM to 8 AM, 9 AM to 12 PM, 1 PM to 4 PM, 5 PM to 8 PM, 8 PM to midnight, and midnight to 5 AM.

Figure 5:
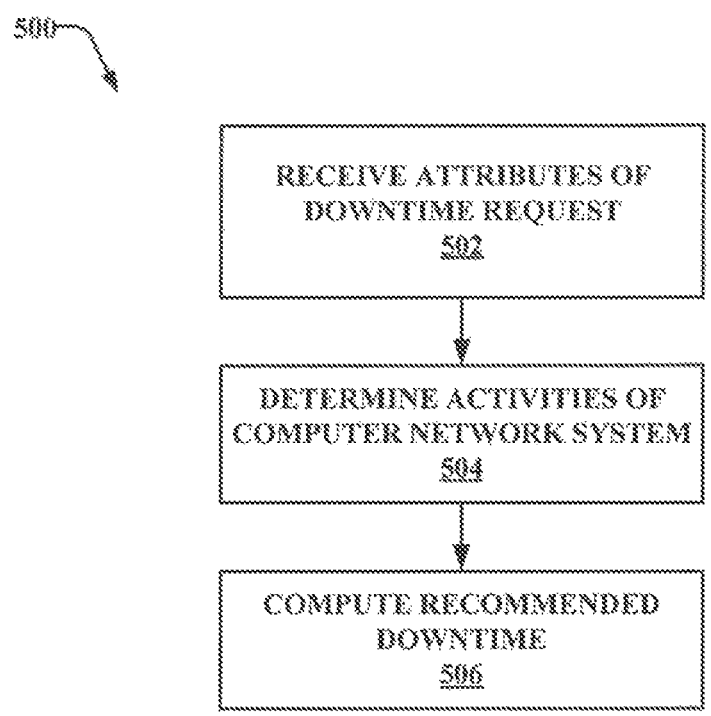
FIG. 5 is a flowchart of a method, in accordance with an example embodiment, for making use of a downtime application.

FIG. 5 is a flowchart 500 of a method, in accordance with an example embodiment, for making use of a downtime application/calculator. At operation 502, a downtime application 122 receives attributes of a downtime request for a computer network system 116. In one example implementation, the downtime request module 202 receives/generates attributes of the downtime request for the computer network system 116.

At operation 504, the downtime application 122 determines activities of the computer network system 116 based geographic zones and times of users accessing the computer network system 116. In one example implementation, the user activity computation engine 204 determines the activities of the users of the computer network.

At operation 506, the downtime application 122 computes a recommended downtime of the computer network system 116 based on the attributes of the downtime request and the activities of the computer network system 116. In one example implementation, the downtime computation engine 206 computes the recommended downtime of the computer network system 116.

Figure 6:
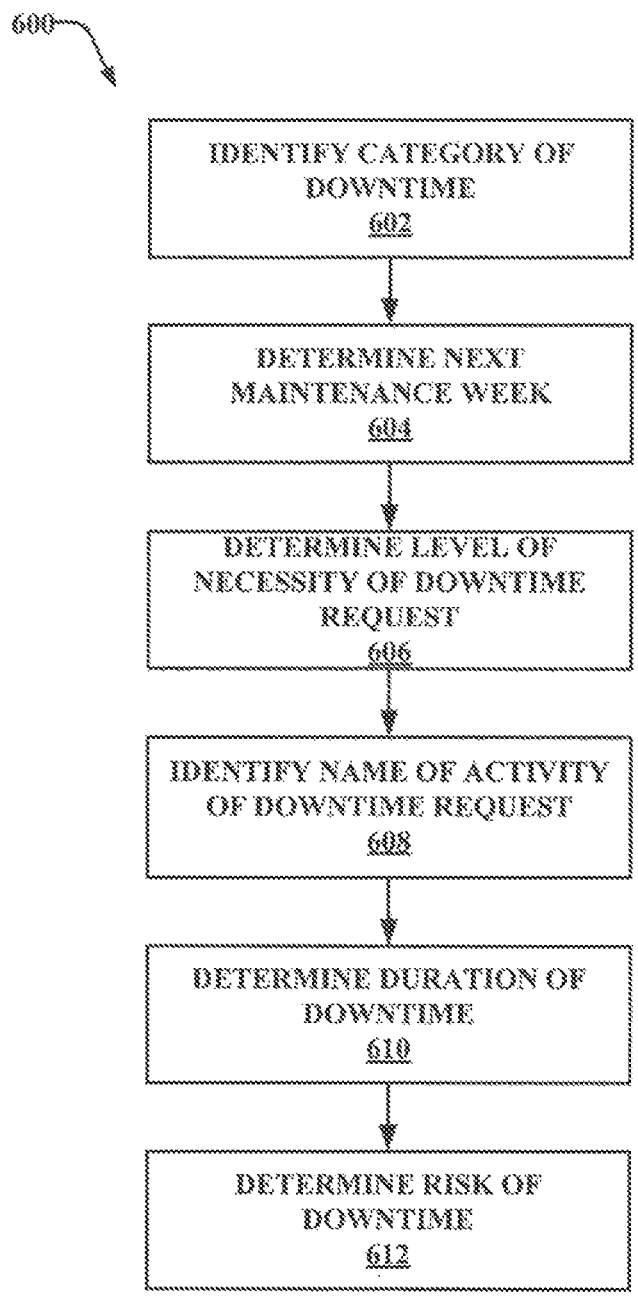
FIG. 6 is a flowchart of a method, in accordance with an example embodiment, for generating a downtime request.

FIG. 6 is a flowchart 600 of a method, in accordance with an example embodiment, for generating a downtime request.

At operation 602, a category of downtime is identified. In one example implementation, the planning mode module 302 identifies a category of causes for the requested downtime. For example, the categories include a regular and planned downtime, an irregular and planned downtime, and an unplanned downtime. The regular and planned downtime includes planned activities that have their next occurrence timeframe known. They include, for example, kernel and weekly updates. The irregular and planned downtime includes planned activities that have their next occurrence timeframe unknown. They include, for example, kernel, database/operating system/file system upgrades, patch upgrades, and extra requests (parameter changes, language installations, and other small upgrades/activities. The unplanned downtime includes unplanned activities such as incidents that are ad hoc and need to be fixed when they occur. They include, for example, transports, kernel, file systems, long running jobs, and database restoration. The downtime request may include a category of causes attribute.

At operation 604, the downtime request is evaluated to determine whether it can be planned for a next maintenance week of the computer network system 116. In one example implementation, the maintenance week module 304 determines whether the downtime can be planned for a next maintenance week of the computer network system 116. An attribute of the downtime request identifies whether the downtime can be planned for the next maintenance week.

At operation 606, a level of necessity of the downtime request is determined. In one example implementation, the downtime necessity module 306 determines a level of necessity of the downtime request. For example, the level of necessity of the downtime may be low, medium, or high. The downtime request may include a level of necessity attribute.

At operation 608, a name of an activity associated with the downtime request is identified. In one example implementation, the downtime activity module 308 identifies a name of an activity associated with the downtime request. For example, the activity may be a kernel upgrade, a file system issue, a patch upgrade, language installation, parameter change, and so forth.

At operation 610, duration of the downtime of the downtime request is determined. In one example embodiment, the downtime duration module 310 determines duration of the downtime of the downtime request. For example, the downtime request may include a downtime duration attribute of 4 hours.

At operation 612, a risk of bringing the computer network system 116 back to normal operation after the downtime is determined. In one example implementation, the risk module 312 determines a risk of bringing the computer network system 116 back after the downtime. For example, the downtime request may include a risk attribute of low, medium, or high.

Figure 7:
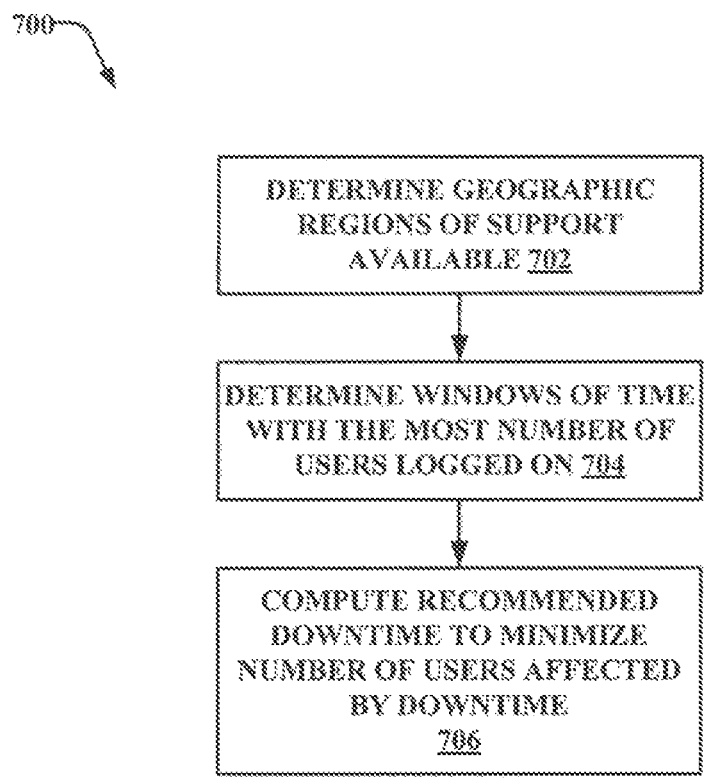
FIG. 7 is a flowchart of a method, in accordance with an example embodiment, for computing a recommended downtime.

FIG. 7 is a flowchart 700 of a method, in accordance with an example embodiment, for computing a recommended downtime. At operation 702, geographic regions of support available for the computer network system 116 at the time of the desired downtime request are determined. In one example implementation, the support location module 402 determines the available geographic regions of support (e.g., IT support).

At operation 704, windows of time with the largest number of users logged on to the computer network system 116 are determined. In one example implementation, the user load module 404 determines the different windows of time with the largest number of users logged on the computer network system 116 based on statistics records of the computer network system 116. For example, the user load module 404 determines the different windows of time with the largest number of users logged on within a week of the downtime request.

At operation 706, the recommended downtime of the computer network system 116 is calculated to minimize the number of users of the computer network system 116 affected by a downtime of the downtime request. In one example implementation, the preferred downtime module 208 of downtime computation engine 206 computes the recommended downtime of the computer network system 116.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein, as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 8:
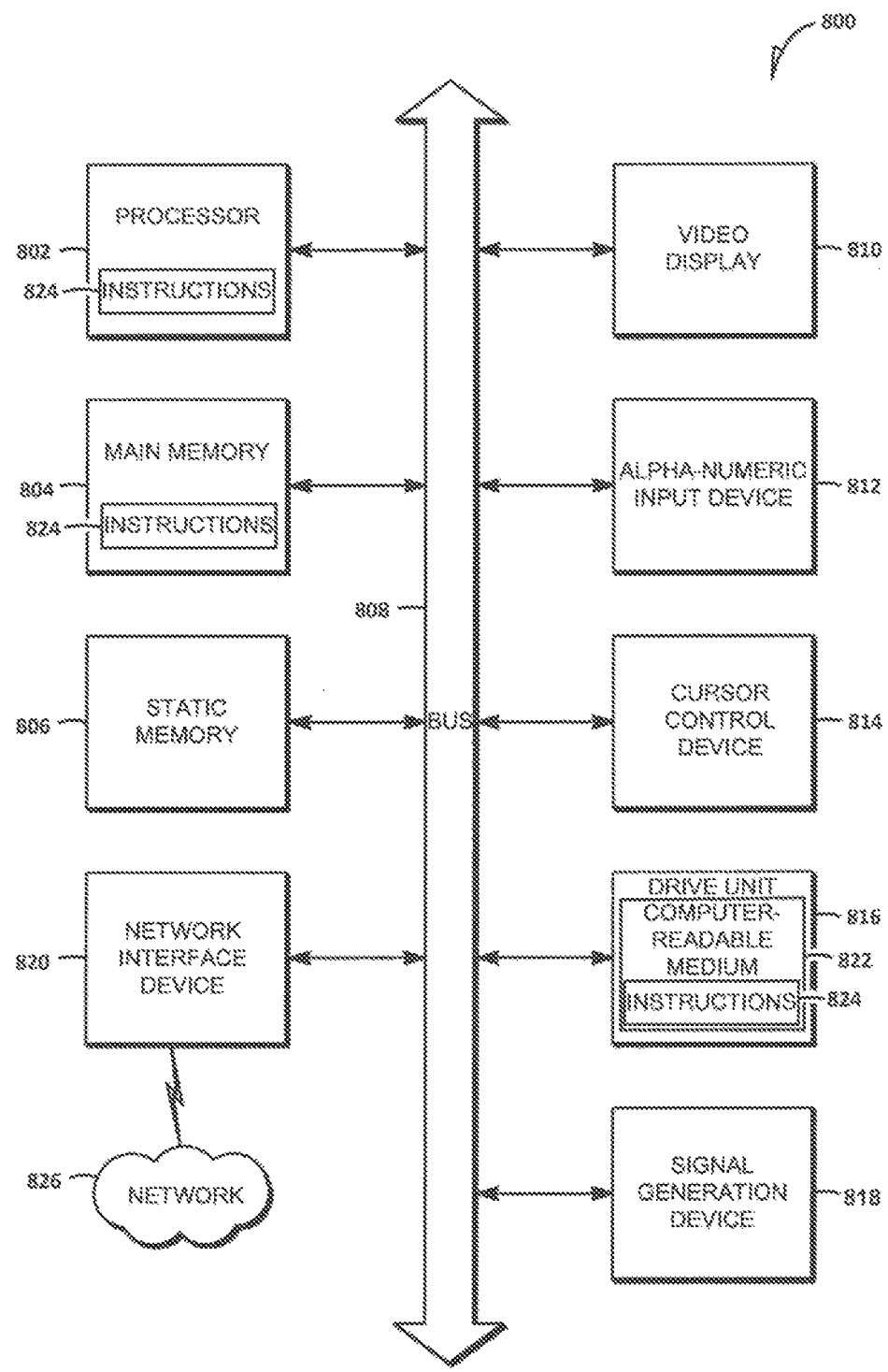
FIG. 8 is a block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable storage medium 822 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies or embodiments of the present description, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including, by way of example, semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and CD-ROM and DVD-ROM disks.

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

It should be noted that various modifications and changes may be made to these example embodiments without departing from the broader spirit and scope of the present embodiment.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of the example embodiments as represented by the appended claims. The specification and drawings are, accordingly, to be regarded in an illustrative rather than a restrictive sense.

What is claimed is:

1. A system comprising:
    a processor of a machine;
    a downtime request module configured to receive attributes of a downtime request for a computer network system, the downtime request module implemented using the processor of the machine, the downtime request identifying a downtime activity to be performed during a downtime and a risk attribute of bringing the computer network system back to an operating condition after the downtime activity is performed during the downtime, wherein the risk attribute depends on a severity of the downtime activity;
    a user activity computation engine configured to determine user activities of the computer network system based on geographic regions and local times of users accessing the computer network system; and
    a downtime computation engine configured to calculate a recommended downtime of the computer network system based on the attributes of the downtime request, user activities on the computer network system, the risk attribute, and a criticality of the downtime activity from the downtime request.

2. The system of claim 1, wherein the computer network system comprises one or more servers geographically located in one or more different geographic time zones.

3. The system of claim 2, wherein the downtime computation engine calculates a recommended time and geographic time zone of a server of the computer network system based on users' login data to the servers of the computer network system within a predefined period of time.

4. The system of claim 1, wherein the downtime request module comprises:
    a planning mode module configured to identify a category of downtime;
    a maintenance week module configured to determine whether the downtime can be planned for a next maintenance week of the computer network system;
    a downtime necessity module configured to determine a level of necessity of the downtime request;
    a downtime activity module configured to identify a name of the downtime activity associated with the downtime request; and
    a downtime duration module configured to determine a duration of the downtime of the downtime request.

5. The system of claim 4, wherein the categories of downtime comprise a regular planned downtime, an irregular planned downtime, and an ad hoc issue downtime.

6. The system of claim 1, wherein the user activity computation engine comprises:
    a support location module configured to determine geographic regions of support available for the computer network system; and
    a user load module configured to determine windows of time with a largest number of users logged on to the computer network system.

7. The system of claim 1, wherein the downtime computation engine comprises:
    a preferred downtime module configured to calculate the recommended downtime of the computer network system to minimize a number of users of the computer network system affected by a downtime of the downtime request.

8. The system of claim 7, wherein the recommended downtime of the computer network system is calculated based on a category of the downtime, whether the downtime can be planned for a next maintenance week of the computer network system, a level of necessity of the downtime request, a name of an activity associated with the downtime request, a duration of the downtime of the downtime request, geographic regions of support available for the computer network system at a time of the downtime, and windows of time with a largest number of users logged on to the computer network system.

9. A computer-implemented method comprising:
    receiving attributes of a downtime request for a computer network system, the downtime request identifying a downtime activity to be performed during a downtime and a risk attribute of bringing the computer network system back to an operating condition after the downtime activity is performed during the downtime, wherein the risk attribute depends on a severity of the downtime activity;

determining user activities of the computer network system based geographic zones and times of users accessing the computer network system; and computing a recommended downtime of the computer network system based on the attributes of the downtime request, the risk attribute, the user activities of the computer network system, and a criticality of the downtime activity from the downtime request.

10. The computer-implemented method of claim 9, wherein the computer network system comprises one or more servers geographically located in one or more different geographic time zones.

11. The computer-implemented method of claim 10, further comprising:

calculating a recommended time and geographic time zone of a server of the computer network system based on users' login data to the servers of the computer network system within a predefined period of time.

12. The computer-implemented method of claim 9, further comprising:

identifying a category of downtime;

determining whether the downtime can be planned for a next maintenance week of the computer network system;

determining a level of necessity of the downtime request;

identifying a name of the downtime activity associated with the downtime request;

determining a duration of the downtime of the downtime request.

13. The computer-implemented method of claim 12, wherein the categories of downtime comprise a regular planned downtime, an irregular planned downtime, and an ad hoc issue downtime.

14. The computer-implemented method of claim 9, wherein determining activities of the computer network system further comprises:

determining geographic regions of support available for the computer network system; and determining windows of time with a largest number of users logged on to the computer network system.

15. The computer-implemented method of claim 9, wherein computing a recommended downtime of the computer network system further comprises:

calculating the recommended downtime of the computer network system to minimize the number of users of the computer network system affected by a downtime of the downtime request.

16. The computer-implemented method of claim 15, wherein calculating the recommended downtime of the computer network system is based on a category of the downtime, whether the downtime can be planned for a next maintenance week of the computer network system, a level of necessity of the downtime request, a name of an activity associated with the downtime request, a duration of the downtime of the downtime request, geographic regions of support available for the computer network system at the time of the downtime, and windows of time with a largest number of users logged on to the computer network system.

17. A non-transitory machine-readable storage medium storing instructions which, when executed by at least one processor, performs operations comprising:

receiving attributes of a downtime request for a computer network system, the downtime request identifying a downtime activity to be performed during a downtime and a risk attribute of bringing the computer network system back to an operating condition after the downtime activity is performed during the downtime, wherein the risk attribute depends on a severity of the downtime activity;

determining user activities of the computer network system based geographic zones and times of users accessing the computer network system; and computing a recommended downtime of the computer network system based on the attributes of the downtime request, the risk attribute, the user activities of the computer network system, and a criticality of the downtime activity from the downtime request.

18. The non-transitory machine-readable storage medium of claim 17, further comprising:

calculating a recommended time and geographic time zone of a server of the computer network system based on users' login data to the servers of the computer network system within a predefined period of time, wherein the computer network system comprises one or more servers geographically located in one or more different geographic time zones.

19. The non-transitory machine-readable storage medium of claim 17, further comprising:

identifying a category of downtime;

determining whether the downtime can be planned for a next maintenance week of the computer network system;

determining a level of necessity of the downtime request;

identifying a name of an activity associated with the downtime request;

determining a duration of the downtime of the downtime request.

20. The non-transitory machine-readable storage medium of claim 19, wherein determining activities of the computer network system further comprises:

determining geographic regions of support available for the computer network system; and determining windows of time with a largest number of users logged on to the computer network system.

* * * * *